United States Patent Office 3,243,258
Patented Mar. 29, 1966

3,243,258
PRODUCTION OF INSOLUBLE SALTS OF 12-HETEROPOLYACIDS
Jakob van R. Smit, Menlo Park, Pretoria, Transvaal, Republic of South Africa, assignor to United Kingdom Atomic Energy Authority, London, England, and South African Council for Scientific and Industrial Research, Pretoria, Transvaal, Republic of South Africa
No Drawing. Filed Apr. 2, 1962, Ser. No. 184,497
Claims priority, application Great Britain, Apr. 11, 1961, 12,999/61
3 Claims. (Cl. 23—51)

The invention relates to the production of insoluble salts of 12-heteropolyacids, and is particularly concerned with the production of cation-exchange materials consisting of insoluble inorganic salts of 12-heteropolyacids.

Insoluble inorganic salts of the 12-heteropolyacids, which are of the type $H_3XO_4 \cdot 12YO_3$ where X is silicon, phosphorus or arsenic, and Y is molybdenum or tungsten, are known to have useful cation-exchange properties. As prepared by ordinary precipitation methods, however, these salts are always obtained in the form of very fine, microcrystalline powders which are unsuitable for use in ion-exchange apparatus since they do not allow practical rates of flow of liquid through beds or columns of the material. It has previously been proposed to mix the ammonium salts of these acids with an inert material such as asbestos to provide the desired degree of porosity and to allow practical flow rates, but this gives a low exchange capacity of the material calculated on a volume basis.

It is believed that the very small size of the crystals of these insoluble salts is due to the weak cohesion forces associated with their peculiar structure. Attempts to produce large crystals of the insoluble salts have not been successful. When freshly prepared, the crystal structure of the 12-heteropolyacids and their isomorphous soluble inorganic salts is quite different, containing a much larger number of molecules of water of crystallisation than in the case of the insoluble salts and consequently there is increased hydrogen bonding which leads to greater cohesin and hence to the formation of large crystals. When dried, for example by heating, by keeping under reduced pressure, or even by exposure to the air for a sufficiently long period, these crystals gradually lose water of crystallisation and eventually break down into micro-crystals isomorphous with the insoluble salts.

In this specification the form of crystal corresponding to the freshly prepared acids and their osmorphous soluble salts will be referred to as the "highly hydrated form," as compared with the form of crystal corresponding to the insoluble salts which contains only about half as much water of crystallisation.

According to the present invention there is provided a method of producing an insoluble salt of a 12-heteropolyacid as hereinbefore defined comprising the step of contacting crystals of the acid or an isomorphous soluble inorganic salt thereof, in the highly hydrated form, with a non-alkaline aqueous solution containing cations of the insoluble salt, without disturbance of the crystals until conversion to the insoluble salt is substantially complete.

For example, crystals of 12-molybdophosphoric acid or 12-tungstophosphoric acid, or the isomorpohous sodium salts of either of these acids, in the highly hydrated form, may be treated by introducing them into a solution of ammonium nitrate to produce particles of ammonium 12-molybdophosphate or 12-tungstophosphate of the same order of size as the original acid crystals, care being taken to avoid stirring until conversion is complete. Very little, if any breakdown into smaller particles occurs.

The particles produced in this instance, consist of stable aggregates of microcrystals of the ammonium salt, and these particles maintain their identity and do not break down into microcrystalline powders, provided that they are maintained in an acidic or neutral electrolyte solution and are not subjected to mechanical attrition or grinding. Alkaline solutions must be avoided since they cause chemical breakdown of the 12-heteropolyacid anion, and if the particles come into contact with pure water or too dilute an electrolyte solution, or are allowed to dry, or are subjected to mechanical shock, they disintegrate into very fine particles of a colloidal nature. It has been found that the particles are stable in electrolyte solutions having concentrations of 1 normal and greater, and thus it is preferred to avoid the use of solutions of lower concentration in view of the possibility of breakdown of the particles into colloidal material. If these conditions are avoided, however, the particles remain stable and eminently suitable for use, without any inert additive such as asbestos, in ion-exchange apparatus.

Contacting may be effected by carefully introducing the crystals into the aqueous solution and leaving them undisturbed for several minutes. Stirring must be avoided until conversion is substantially complete since the conversion involves a solid phase transition, which sets up strains in the crystals, and even slight mechanical shocks received by the crystals at such a time cause their disintegration into colloidal particles or single microcrystals. When the conversion is complete, the whole of the crystal has been converted into microcrystals of the insoluble salt, joined together in a stable particle, which is much less sensitive to physical breakdown.

Insoluble salts of 12-heteropolyacids which can be produced by the method of the invention include the ammonium, potassium, rubidium, caesium and monovalent silver, thallium and mercury salts of 12-heteropolyacids as above defined. The ammonium and potassium salts of these acids have particularly useful cation-exchange properties, since the ammonium and potassium ions therein are readily exchangeable with the other ions forming insoluble salts, and therefore they can be used to separate for example, rubidium and caesium from mixtures thereof, or from mixtures of these metals with other elements in aqueous solution. A particular application of such use is in the separation of radioactive caesium from mixtures of nuclear fission products in acidic or neutral solutions.

Desirable particle sizes for use in ion-exchange apparatus are, for example, in the range which pass a British Standard 20-mesh sieve (approximately 725 microns), but are retained on a 200-mesh sieve (approximately 76 microns). These particle sizes can be achieved in the method of the invention by selecting a suitable size range of crystals of the 12-heteropolyacid or soluble inorganic salt thereof that is to say by avoiding the use of any very large or very fine crystals, and/or by subsequently sieving the particle of the insoluble salt to the desired size range. It is desirable so to select the original size range of the acid crystals as to lead to the production of particles, by the method of the invention, which are suitable for use in ion exchange apparatus, with little or no further treatment other than the removal of colloidal material, e.g. by decantation.

The insoluble salts of 12-heteropolyacids produced by the method of the invention are, as mentioned above, in the form of particles having a particular structure. This structure is of particular advantage in ion-exchange materials since it is porous and provides a high surface area for ion-exchange purposes, without offering high resistance to liquid flow as in the case with very finely powdered material.

Thus, also according to the invention a cation-exchange material is provided which consists of particles of an insoluble inorganic salt of a 12-heteropolyacid as hereinbefore defined, each particle of the material consisting of a stable, porous aggregate of microcrystals of the salt.

Photomicrographs of particles of ammonium 12-molybdophosphate produced by the method of the invention, and of ammonium 12-molybdophosphate produced by conventional precipitation methods, clearly show the much greater particle size of the former compared with the latter. At high magnifications, they also show that the particles of the former consist of porous aggregates of large numbers of microcrystals of a mean diameter which is of the order of 1 micron or less whereas the particles of the latter consist only of single or twinned crystals of a mean diameter which is of the order of a few microns.

*Example I*

25 g. of phosphomolybdic acid crystals in the highly hydrated form having the formula $H_3PO_4.12MoO_3.24H_2O$, were gently crushed in a mortar and carefully added to 50 ml. of a 4-normal solution of ammonium nitrate. The clear crystals immediately lost their lustre and became opaque; they were allowed to stand undisturbed for 2 days and then wet screened on nylon meshed sieves by means of 1-normal ammonium nitrate.

*Example II*

25 g. of phosphotungstic acid crystals in the highly hydrated form, having the formula $H_3PO_4.12WO_3.24H_2O$, were treated exactly as the crystals in Example I.

The particle size distribution by weight of the ammonium salts produced according to each example is shown in the following table in which the mesh sizes are those of British Standard Sieves.

| Mesh size | Example I | Example II |
| --- | --- | --- |
|  | Percent | Percent |
| >40 | 26.0 | 39.5 |
| 40–60 | 18.3 | 23.6 |
| 60–80 | 33.6 | 15.9 |
| 80–100 | 10.6 | 4.1 |
| 100–200 | 10.2 | 8.0 |
| >200 | 1.3 | 8.9 |

From the table, it is apparent that 98.7% by weight of the ammonium molybdophosphate and 91.1% by weight of the ammonium tungstophosphate produced in the examples was of a size suitable for use in ion-exchange apparatus.

*Example III*

An ion-exchange column having a circular cross-sectional area of 0.9 cm.² was filled to a depth of 7.0 cm. by washing the 60–80 mesh fraction of the ammonium salt produced as in Example I into the column with 1-normal ammonium nitrate solution and packing down well by gentle tapping. 1-normal ammonium nitrate solution was then passed through the column under a constant liquid head of 60 cm. of solution. The flow rate, after a small decrease during the first hour, remained substantially constant at about 13 ml./minute (equivalent to about 14 linear cm./minute) for 8 hours. After stopping the flow for 15 hours flow was resumed and the rate was substantially unaltered from the previous rate. The constancy of flow rate showed that no significant breakdown of the particles was occurring.

I claim:

1. A method of producing coarse crystals of an insoluble salt selected from the group consisting of ammonium, potassium, rubidium, caesium, monovalent silver, monovalent thallium and monovalent mercury salts of a 12-heteropolyacid of the type $H_3XO_4.12YO_3$ where X is one of the group consisting of silicon, phosphorus and arsenic and Y is one of the group consisting of molybdenum and tungsten, such method comprising the steps of adding crystals of a material selected from the group consisting of the hydrated form of the said 12-heteropolyacid having the formula $H_3XO_4.12YO_3.24H_2O$, and the isomorphous soluble inorganic salts thereof to a non-alkaline aqueous solution containing cations selected from the group of ammonium, potassium, rubidium, caesium, monovalent silver, monovalent thallium and monovalent mercury with minimum disturbance of the crystals to convert said crystals to crystals of said insoluble salt having a particle size of at least about 76 microns.

2. A method of producing coarse crystals of ammonium 12-molybdophosphate comprising the steps of adding crystals of a material selected from the group consisting of hydrated 12-molybdophosphoric acid having the formula $H_3PO_4.12MoO_3.24H_2O$, and the isomorphous sodium salt thereof to an aqueous solution of ammonium nitrate with minimum disturbance of the crystals to convert said crystals to crystals of ammonium 12-molybdophosphate having a particle size of at least about 76 microns.

3. A method of producing coarse crystals of ammonium 12-tungstophosphate comprising the steps of adding crystals of a material selected from the group of hydrated 12-tungstophosphoric acid having the formula $$H_3PO_4.12WO_3.24H_2O$$

and the isomorphous sodium salt thereof to an aqueous solution of ammonium nitrate with minimum disturbance of the crystals to convert said crystals to crystals of ammonium 12-tungstophosphate having a particle size of at least about 76 microns.

References Cited by the Examiner

UNITED STATES PATENTS 2,788,258   4/1957   Arnold  23—51

OTHER REFERENCES

Jacobson: "Encyclopedia of Chemical Reactions," vol. 4, Reinhold Pub. Corp., New York, 1951, pages 671, 672.

Mellor: "A Comprehensive Treatise on Inorganic and Theoretical Chemistry," vol. 11, Longmans, Green and Co., New York, 1931, pages 662–671, 863–867, and 872–873 (pages 663–665, 865–867 and 872 of particular interest).

OSCAR R. VERTIZ, *Primary Examiner.*

BENJAMIN HENKIN, MAURICE A. BRINDISI,
*Examiners.*

H. T. CARTER, *Assistant Examiner.*